March 4, 1924.
T. C. RUSH
DOOR GRILL
Filed Aug. 1, 1922
1,486,038
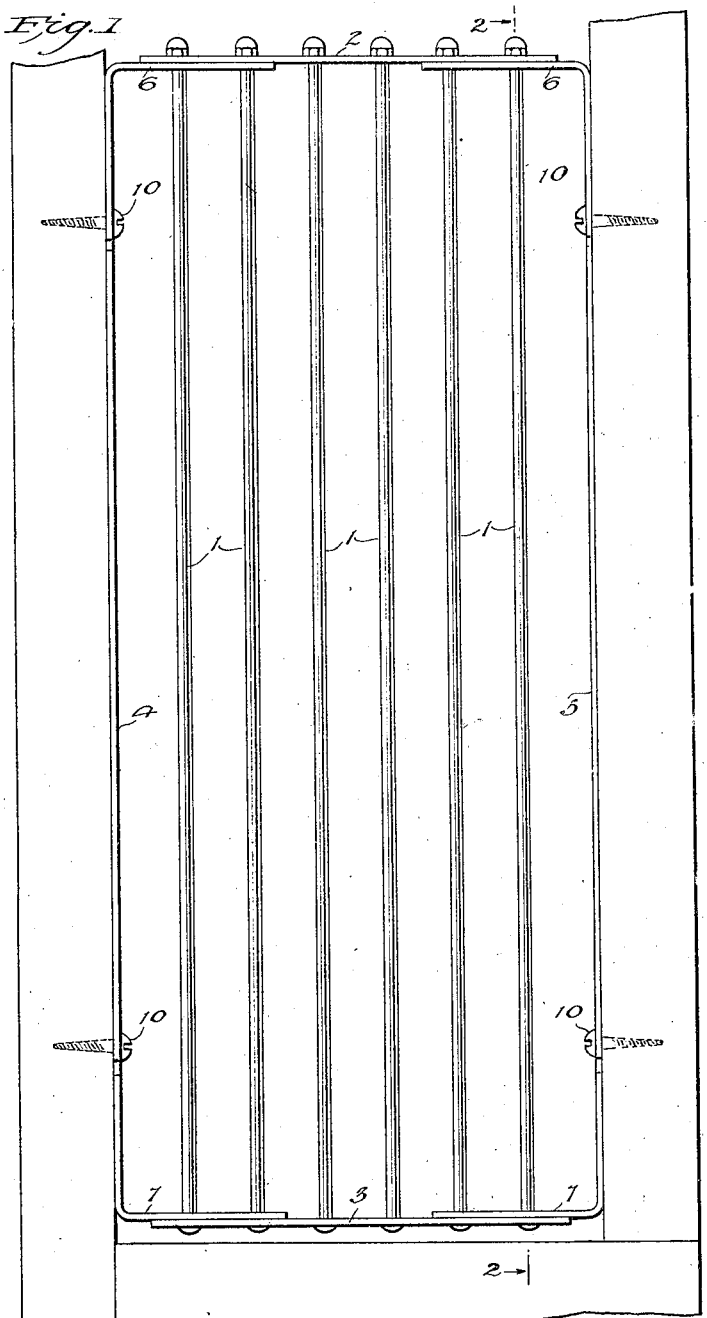
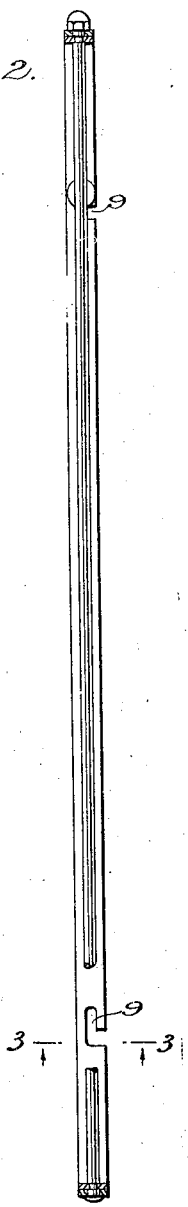
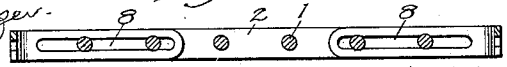
INVENTOR
T. C. RUSH
ATTORNEYS Patented Mar. 4, 1924.

1,486,038

UNITED STATES PATENT OFFICE.

TURNER C. RUSH, OF LEXINGTON, KENTUCKY, ASSIGNOR TO JOHN B. ERD, OF LEXINGTON, KENTUCKY.

DOOR GRILL.

Application filed August 1, 1922. Serial No. 578,915.

*To all whom it may concern:*

Be it known that I, TURNER C. RUSH, a citizen of the United States, and a resident of Lexington, in the county of Fayette and State of Kentucky, have invented a new and Improved Door Grill, of which the following is a full, clear, and exact description.

This invention relates to a door grill, and has for an object the provision of a simple, strong, durable and readily adjustable grill for the apertures of doors, windows and the like.

Another object resides in the particular construction and arrangement of parts which are hereinafter described and claimed and shown in the accompanying drawings.

The invention is illustrated in the drawings, of which—

Figure 1 is a front elevation of the grill in place in the door frame.

Fig. 2 is a section taken on the line 2—2 of Fig. 1.

Fig. 3 is a section taken on the line 3—3 of Fig. 2.

The form of the invention shown in the drawings is a preferred form, although it is understood that modifications in the construction and arrangement of the parts and in the character of the materials used may be adopted without departing from the spirit of the invention.

The invention contemplates the provision of a grill which can be readily adjustable in any opening, such as a door frame, shown in the drawing, and comprises a plurality of parallel bars 1 which at their ends are connected together by being fastened in any suitable manner to plates or bars 2 and 3. The frame also comprises lateral plates 4 and 5 each of which is provided with outwardly projecting limbs or legs 6 and 7. These legs are provided with slots 8 through which one or more of the bars 1 project, the limbs or legs 6 and 7 lying beneath portions of the plates or bars 2 and 3 to slidably support the same. It will, therefore, be apparent that the width of the frame, as shown disposed in the opening in the drawing, can be adjusted by sliding the lateral plate with respect to the frame.

Each of the lateral plates 4 and 5 is provided with bayonet slots 9 with which any suitable means, such as screws 10, fastened to the frame of the opening, are adapted to engage. Therefore, the grill as a whole can be very readily removed from the opening in which it is disposed by merely sliding the frame up and then out, so as to disengage the screws or fastening means from the slots 9. The grill is adapted to be readily adjusted in any sized opening, and this adjustability is only limited by the amount to which the lateral members can be moved with respect to the plates 2 and 3.

The material, of course, of which the grill is made can be changed, and its particular physical form may assume many designs and shapes while still being within the scope of the invention.

What I claim is:

1. A door grill comprising a plurality of parallel bars supported by end plates, a pair of lateral plates having slotted projecting limbs slidably engaged with the end plates and bars for the adjustment of the width of the grill, said lateral plates having bayonet slots to engage with suitable fastening means on the frame of the opening in which the grill is to be disposed.

2. A door grill which comprises parallel bars connected at their ends by plates, and lateral frame plates having end limbs projecting at right angles thereto and slotted, certain of the bars passing through said slots, the limbs adapted to lie within portions of the end plates to slidably engage the same.

3. A door grill which comprises parallel bars connected at their ends by plates, lateral frame plates having end limbs projecting at right angles thereto and slotted, certain of the bars passing through said slots, the limbs adapted to lie within portions of the end plates to slidably engage the same, said lateral plates having bayonet slots, and fastening means disposed on the frame on which the grill is to be supported and adapted to engage in the bayonet slots to removably support the grill.

TURNER C. RUSH.